(12) United States Patent
Sunada et al.

(10) Patent No.: US 9,494,202 B2
(45) Date of Patent: Nov. 15, 2016

(54) CLUTCH

(71) Applicant: TOYOTA JIDOSHA KABUSHIKI KAISHA, Toyota-shi, Aichi-ken (JP)

(72) Inventors: Hirotaka Sunada, Nagoya (JP); Shintaro Nakano, Toyota (JP); Daisuke Kobayashi, Okazaki (JP); Akifumi Oosugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/906,388

(22) PCT Filed: Jul. 18, 2014

(86) PCT No.: PCT/JP2014/069156
§ 371 (c)(1),
(2) Date: Jan. 20, 2016

(87) PCT Pub. No.: WO2015/012211
PCT Pub. Date: Jan. 29, 2015

(65) Prior Publication Data
US 2016/0169301 A1 Jun. 16, 2016

(30) Foreign Application Priority Data

Jul. 25, 2013 (JP) ................................. 2013-154987

(51) Int. Cl.
| | |
|---|---|
| *F16D 41/066* | (2006.01) |
| *F16D 41/08* | (2006.01) |
| *F16D 15/00* | (2006.01) |
| *F16D 27/10* | (2006.01) |

(52) U.S. Cl.
CPC ............. *F16D 41/066* (2013.01); *F16D 15/00* (2013.01); *F16D 41/08* (2013.01); *F16D 41/086* (2013.01); *F16D 27/10* (2013.01)

(58) Field of Classification Search
CPC .... F16D 41/066; F16D 41/08; F16D 41/086; F16D 15/00
USPC ........................................ 192/45.004, 45.005
See application file for complete search history.

(56) References Cited

FOREIGN PATENT DOCUMENTS

| | | | |
|---|---|---|---|
| DE | 102009025330 | * | 12/2010 |
| JP | S49-84813 A | | 8/1974 |
| JP | H05-19670 U | | 3/1993 |
| JP | 2003-285994 A | | 10/2003 |
| JP | 2004-245316 A | | 9/2004 |
| JP | 2006-307973 A | | 11/2006 |
| JP | 2010-084847 A | | 4/2010 |
| JP | 2010-203406 A | | 9/2010 |
| JP | 2011-220411 A | | 11/2011 |
| JP | 2013-057293 A | | 3/2013 |
| JP | 2015-021568 A | | 2/2015 |

* cited by examiner

*Primary Examiner* — Mark Manley
(74) *Attorney, Agent, or Firm* — Oliff PLC (57) ABSTRACT

An annular groove is provided in a driving-side rotor of a clutch. Guide grooves are provided on a driven-side rotor of the clutch. By moving the driving-side rotor relative to the driven-side rotor, balls are moved that are accommodated in the spaces provided by the sections where the guide grooves and the annular groove face each other. Moving the balls toward the sections where the gap between the driving-side rotor and the driven-side rotor is narrow causes the balls to engage with the driving-side rotor and the driven-side rotor to achieve an engaged state. A disengaged state, in which engagement is cancelled, is achieved by moving the balls to the sections where the gap is wide.

4 Claims, 5 Drawing Sheets

CLUTCH

TECHNICAL FIELD

The present invention relates to a clutch.

BACKGROUND ART

Conventionally, a clutch configured to switch states of power transmission between an outer wheel and an inner wheel, which is arranged on the inner side of the outer wheel, is known (for example, Patent Document 1). In the clutch, an annular holding device, which accommodates rollers each serving as an engagement element, is arranged in the space in which the outer wheel and the inner wheel face each other. Flat cam surfaces are provided on an outer circumferential surface of the inner wheel. The cam surfaces provide wedge-shaped spaces, each of which becomes gradually narrower toward the opposite circumferential sides, between the cam surfaces and the outer wheel.

To couple the inner wheel and the outer wheel to each other, the clutch rotates the holding device together with the outer wheel to pivot the holding device relative to the inner wheel, thus moving each of the rollers, which are accommodated in the holding device, into a narrow space in the corresponding one of the aforementioned wedge-like spaces. The rollers are thus clamped between the inner wheel and the outer wheel such that the inner wheel and the outer wheel are coupled together by the rollers. As a result, the inner wheel and the outer wheel rotate integrally.

In contrast, to decouple the inner wheel and the outer wheel from each other, the holding device and the outer wheel are decoupled from each other. This causes an urging member, which is coupled to the inner wheel, to press and return the holding device to move each roller, which is accommodated in the holding device, from the narrow space into a large space in the corresponding wedge-like space. This causes the rollers to roll between the inner wheel and the outer wheel. As a result, the inner wheel and the outer wheel are disengaged from each other, and power transmission between the inner wheel and the outer wheel is canceled.

PRIOR ART DOCUMENT

Patent Document

Patent Document 1: Japanese Laid-Open Patent Publication No. 2004-245316

SUMMARY OF THE INVENTION

Problems that the Invention is to Solve

In the above-described clutch, the holding device is arranged between the outer wheel and the inner wheel. The spaces for accommodating the rollers are defined by the outer circumferential surface of the inner wheel, the inner circumferential surface of the outer wheel, and pockets of the holding device. That is, the spaces for accommodating the rollers are provided by combining three components. Therefore, to ensure appropriate switching of the transmission states, tolerance must be controlled while taking into consideration variations in the dimensions of the three components, which are the inner wheel, the outer wheel, and the holding device. This requires high machining accuracy.

Accordingly, it is an objective of the present invention to provide a clutch capable of switching states of power transmission between an inner wheel and an outer wheel without employing a holding device.

Means for Solving the Problems

To achieve the foregoing object and in accordance with the present invention, a clutch is provided that includes a rotary shaft, an outer wheel and an inner wheel both rotational about an axis of the rotary shaft, and an engagement element arranged between the outer wheel and the inner wheel. The outer wheel and the inner wheel each have a facing surface. The facing surfaces face each other. The facing surface of one of the outer wheel and the inner wheel has an annular groove extending circumferentially along the entire circumference of the facing surface. The facing surface of the other one of the outer wheel and the inner wheel has a guide groove extending in a direction intersecting a plane perpendicular to the axis of the rotary shaft. A space configured to accommodate the engagement element is provided in a section in which the guide groove and the annular groove face each other. The engagement element is moved in the guide groove and the annular groove by moving the outer wheel and the inner wheel relative to each other in the axial direction of the rotary shaft. By moving the engagement element toward a section in which a gap between the outer wheel and the inner wheel is smaller than a diameter of the engagement element to clamp the engagement element between the outer wheel and the inner wheel, a coupled state is achieved, in which the outer wheel and the inner wheel are coupled to each other. By moving the engagement element to a section in which the gap between the outer wheel and the inner wheel is greater than the diameter of the engagement element, a decoupled state is achieved, in which the outer wheel and the inner wheel are decoupled from each other.

In the above-described configuration, the guide groove extends in the direction intersecting the plane perpendicular to the axis of the rotary shaft. The guide groove is thus inclined with respect to or perpendicular to the annular groove.

In the configuration, the engagement element is accommodated in the space in the section in which the annular groove and the guide groove, which is inclined with respect to or perpendicular to the annular groove, face each other. Therefore, by moving the outer wheel and the inner wheel relative to each other in the axial direction of the rotary shaft, the positions of the sections of the annular groove and the guide groove that face each other are changed to move the engagement element between the outer wheel and the inner wheel.

As a result, the configuration changes the position of the engagement element without employing a holding device for accommodating the engagement element between the outer wheel and the inner wheel. The states of power transmission between the inner wheel and the outer wheel are thus switched without using the holding device.

In the above described clutch, the outer wheel is preferably a driving-side rotor and the inner wheel is a driven-side rotor, and the annular groove is preferably provided in an inner circumferential surface of the outer wheel and the guide groove is provided in an outer circumferential surface of the inner wheel. The guide groove is preferably shallower in a section in which the engagement element is arranged when in the coupled state than a section in which the engagement element is arranged when in the decoupled state. The guide groove is configured such that, when the decoupled state is switched to the coupled state, the engagement element moves along the guide groove in a rotating direction of the outer wheel.

In the above-described configuration, as the outer wheel, which is the driving-side rotor, rotates, the engagement element receives force acting to move the engagement element in the guide groove in the rotating direction of the outer wheel. Therefore, as the drive force input from the outer wheel, which is the driving-side rotor, becomes greater, the engagement element becomes more driven toward a shallow section of the guide groove. This facilitates maintenance of a state in which the engagement element is clamped between the outer wheel and the inner wheel, thus permitting transmission of great drive force.

In the above described clutch, in which the outer wheel is the driving-side rotor and the inner wheel is the driven-side rotor, a helical groove extending about the axis of the rotary shaft is preferably provided in the outer circumferential surface of the inner wheel in addition to the guide groove. The clutch preferably further includes a locking member and an urging member configured to urge the inner wheel from a decoupling position, at which the inner wheel is decoupled from the outer wheel, toward a coupling position, at which the inner wheel is coupled to the outer wheel. The engagement member is preferably inserted into the helical groove and engaged with a side wall of the helical groove to move the inner wheel to the decoupling position against an urging force of the urging member.

In the above-described configuration, the urging force of the urging member urges the inner wheel from the decoupling position toward the coupling position. When the inner wheel is at the coupling position, the outer wheel and the inner wheel are in the coupled state. If the locking member is inserted into the helical groove of the inner wheel, which is in the coupled state and rotates together with the outer wheel, the inner wheel rotates with the side wall of the helical groove, which is inclined with respect to the axial direction of the rotary shaft, engaged with the locking member. This moves the inner wheel from the coupling position to the decoupling position against the urging force of the urging member, thus decoupling the outer wheel and the inner wheel from each other. That is, in the configuration, the force necessary for disengaging the clutch is obtained from the rotation force of the inner wheel. As a result, such disengagement is brought about by small force.

In accordance with one aspect of the present invention, the guide groove is a curved groove extending in the outer circumferential surface of the inner wheel in a curved manner.

In the above described clutch, in which the outer wheel is the driving-side rotor and the inner wheel is the driven-side rotor, the curved groove is preferably curved such that an inclination of the curved groove with respect to the rotating direction of the outer wheel becomes gradually smaller from the section in which the engagement element is arranged when in the decoupled state toward the section in which the engagement element is arranged when in the coupled state.

When switching from the decoupled state to the coupled state causes the engagement element to be quickly clamped between the outer wheel and the inner wheel to rapidly increase the rotating speed of the inner wheel, the clutch receives great impact load due to the switching operation to the engaged state.

In the above-described configuration, when the outer wheel and the inner wheel are moved relative to each other in the axial direction of the rotary shaft to switch from the decoupled state to the coupled state, the movement amount of the engagement element, which moves along the curved groove, in the rotating direction of the outer wheel becomes greater toward the coupled state.

Therefore, at an early stage of switching from the decoupled state to the coupled state, the movement amount of the engagement element in the rotating direction of the outer wheel is small and the engagement element does not become clamped between the outer wheel and the inner wheel. As a result, friction causes the rotating speed of the outer wheel and the rotating speed of the inner wheel to become close to each other. Then, in a later stage of switching from the decoupled state to the coupled state, the movement amount of the engagement element in the rotating direction of the outer wheel increases to clamp the engagement element between the inner wheel and the outer wheel, thus coupling the outer wheel and the inner wheel to each other.

That is, the configuration permits slow progression of coupling between the outer wheel and the inner wheel, thus reducing the impact load caused by switching from the decoupled state to the coupled state.

In accordance with one aspect of the present invention, the guide groove is preferably a linear groove extending linearly in the outer circumferential surface of the inner wheel.

In the above described clutch, in which the outer wheel is the driving-side rotor and the inner wheel is the driven-side rotor, the linear groove preferably intersects the plane perpendicular to the axis of the rotary shaft in a manner inclined by 45° with respect to the plane.

If the depth change amount per unit length of a linear groove that becomes shallower toward the section in which the engagement element is arranged when in the coupled state remains unchanged, the length of the linear groove necessary for switching between the coupled state and the decoupled state remains the same. Therefore, in this case, as the angle between the linear groove and the plane perpendicular to the axis of the rotary shaft becomes greater, or, in other words, as the extending direction of the linear groove becomes less inclined with respect to the axial direction of the rotary shaft, the length of the inner wheel in the direction of the rotation axis necessary for providing a linear groove having a length necessary for switching between the coupled state and the decoupled state becomes greater. As a result, as the angle between the linear groove and the plane perpendicular to the axis of the rotary shaft becomes greater, the length of the inner wheel in the direction of the rotation axis becomes greater and the size of the clutch becomes greater.

In contrast, when the outer wheel and the inner wheel are moved relative to each other in the axial direction of the rotary shaft to switch from the coupled state to the decoupled state, the engagement element, which is arranged in the shallow section of the linear groove, must be moved backward with respect to the rotating direction of the outer wheel and the inner wheel. As the angle between the linear groove and the plane perpendicular to the axis of the rotary shaft becomes smaller, the amount of movement of the engagement element backward with respect to the rotating direction of the outer wheel and the inner wheel becomes greater. This increases the force necessary for switching to the decoupled state.

However, in the above-described configuration, the linear groove extends to form an angle of 45° with respect to the plane perpendicular to the axis of the rotary shaft. This restrains enlargement of the size of the inner wheel, in which the linear groove is provided, and also restrains increase of the force necessary for switching to the decoupled state.

Also, in the above-described clutch, it is preferable that the engagement element be a ball.

If the engagement element is a ball, which has neither anisotropy nor corners, the engagement element is moved smoothly even when arranged between the annular groove and the guide groove, which intersect each other. As a result, switching between the coupled state and the decoupled state is smoothly carried out.

MODES FOR CARRYING OUT THE INVENTION

First Embodiment

A clutch according to a first embodiment will now be described with reference to FIGS. 1 to 4.

The clutch according to the first embodiment switches states of power transmission from a crankshaft arranged in an engine to a water pump that circulates engine coolant.

Figure 1:
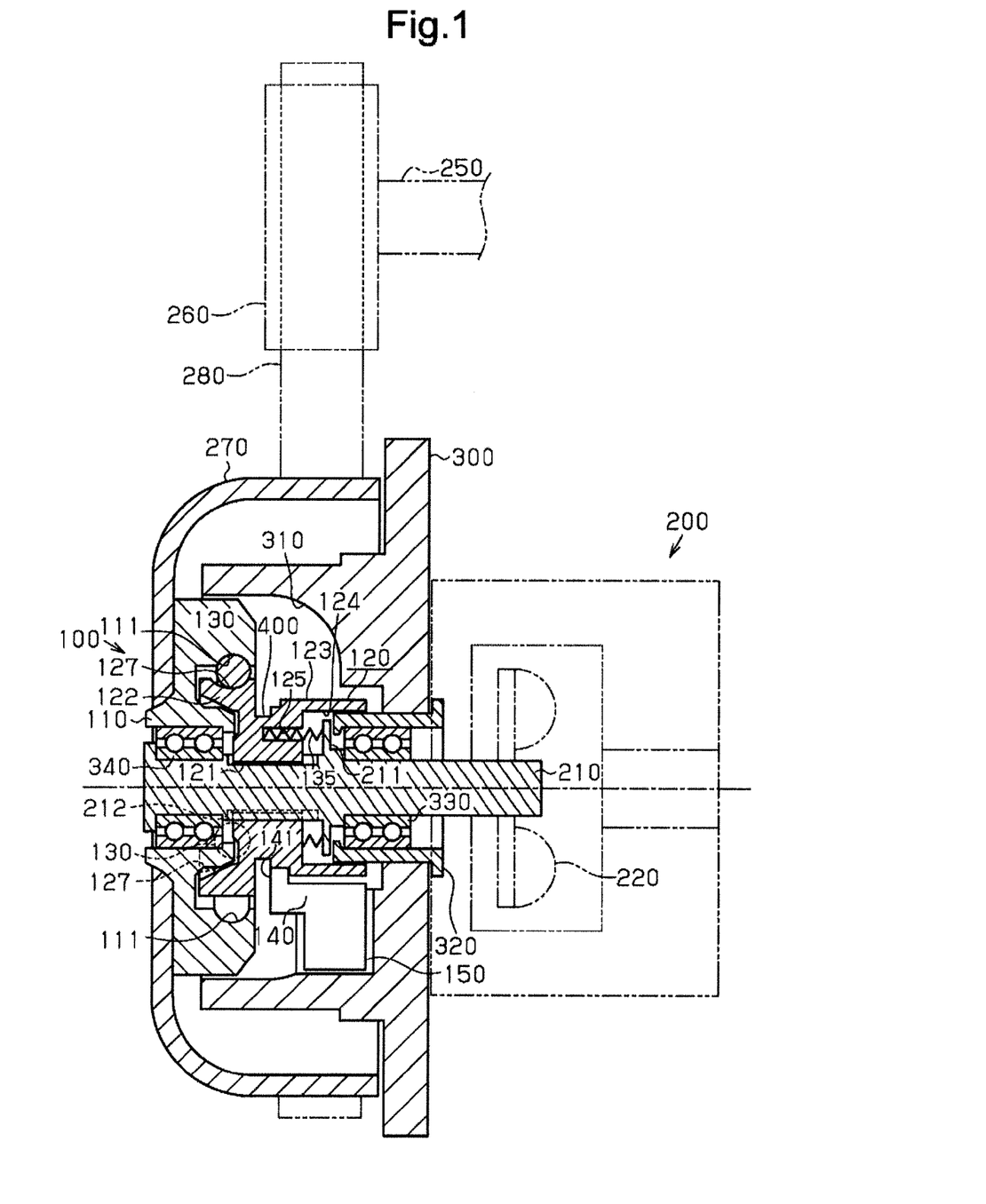
FIG. 1 is a cross-sectional view showing a clutch according to a first embodiment.

As shown in FIG. 1, a clutch 100 of the first embodiment is accommodated in an accommodating portion 310, which is arranged in a housing 300. A tubular support member 320 is received in the housing 300. An output shaft 210 of the clutch 100, which is a rotary shaft, is rotationally supported by the support member 320 via a first bearing 330, which is located radially inward of the support member 320.

An impeller 220 of a pump 200 is attached to the distal end section (the right end section as viewed in FIG. 1) of the output shaft 210 in an integrally rotational manner. A driving-side rotor 110 is rotationally supported by the basal end section (the left end section as viewed in the drawing) of the output shaft 210 via a second bearing 340. A straight spline 212 is provided in an outer circumferential surface of a section of the output shaft 210 between the first bearing 330 and the second bearing 340.

A cup-shaped driven-side pulley 270, which surrounds the clutch 100 accommodated in the accommodating portion 310 of the housing 300, is attached to the driving-side rotor 110. A driving-side pulley 260 is attached to an end section of a crankshaft 250 in an integrally rotational manner. The driving-side pulley 260 and the driven-side pulley 270 are coupled to each other by a belt 280, which is looped over the driving-side pulley 260 and the driven-side pulley 270.

A driven-side rotor 120 is arranged between the housing 300 and the driving-side rotor 110. The driven-side rotor 120 has an engagement portion 121, which is located on the inner circumferential surface of the driven-side rotor 120 and received by the straight spline 212. This allows the driven-side rotor 120 to rotate integrally with the output shaft 210 and move in the axial direction of the output shaft 210. In the first embodiment, the output shaft 210, the driving-side rotor 110, and the driven-side rotor 120 are coaxial as represented by the long dashed short dashed lines in FIGS. 1 to 3. Hereinafter, the extending direction of the axis will be referred to as the axial direction. As represented by the arrows in FIGS. 2 and 3, the driving-side rotor 110 rotates clockwise as viewed from the distal end side (the right end side as viewed in FIGS. 2 and 3) of the output shaft 210 toward the driving-side rotor 110. Hereinafter, the rotating direction of the driving-side rotor 110 will be referred to as the rotating direction.

With reference to FIG. 1, the driven-side rotor 120 has an outline formed by coaxially joining a pair of pillars having different diameters. The driven-side rotor 120 is supported by the output shaft 210 in such an orientation that a large diameter portion 122 and a small diameter portion 123 are respectively located on the side closer to the driving-side rotor 110 (the left side as viewed in FIG. 1) and on the side closer to the pump 200 (the right side as viewed in the drawing). The large diameter portion 122 of the driven-side rotor 120 is arranged on the inner side of the driving-side rotor 110 such that the outer circumferential surface of the large diameter portion 122 faces the inner circumferential surface of the driving-side rotor 110. That is, in the first embodiment, the driving-side rotor 110 configures an outer wheel and the driven-side rotor 120 configures an inner wheel. The inner circumferential surface of the driving-side rotor 110 and the outer circumferential surface of the large diameter portion 122 of the driven-side rotor 120 are facing surfaces that face each other.

A recess 124, which opens toward the pump 200, is provided in the small diameter portion 123 of the driven-side rotor 120. Accommodating recesses 125 that accommodate urging members 135 are arranged circumferentially in the bottom section of the recess 124 in a manner surrounding the output shaft 210.

Each of the urging members 135 is, for example, a coil-shaped spring and accommodated in the corresponding one of the accommodating recesses 125 of the driven-side rotor 120. Each urging member 135 has a distal end locked by a locking projection 211, which is provided in the output shaft 210. The urging members 135 are accommodated in the corresponding accommodating recesses 125 each in a compressed state, thus urging the driven-side rotor 120 toward the driving-side rotor 110 (leftward as viewed in FIG. 1).

Figure 2:
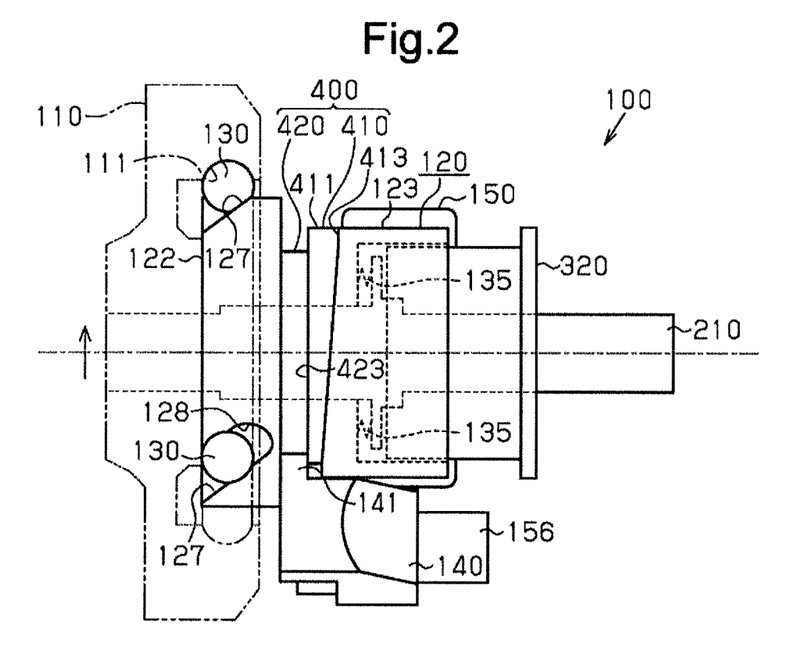
FIG. 2 is a side view showing the clutch of FIG. 1 in a disengaged state.
Figure 3:
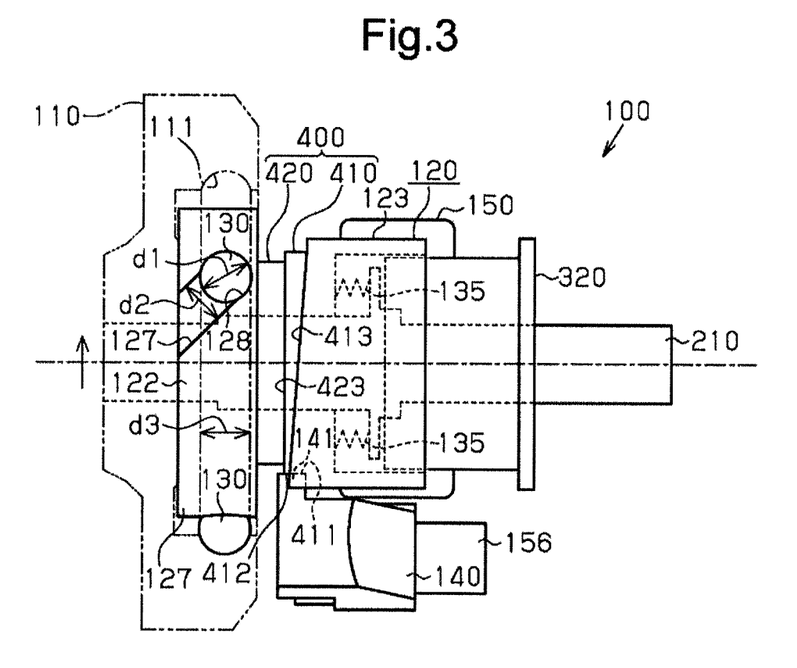
FIG. 3 is a side view showing the clutch of FIG. 1 in an engaged state.

As illustrated in FIGS. 2 and 3, the driven-side rotor 120 has guide grooves, or, in other words, linear grooves 127, which are provided in the outer circumferential surface of the large diameter portion 122 and extend in a direction intersecting a plane perpendicular to the axis. The linear grooves 127 are arranged at intervals in the circumferential direction. With reference to FIGS. 1 to 3, an annular groove 111, which extends circumferentially along the entire circumference of the driving-side rotor 110, are provided in the inner circumferential surface of the driving-side rotor 110. That is, the annular groove 111 is a groove extending along the plane perpendicular to the axis. The annular groove 111 has an arcuate cross section as illustrated in FIG. 1. The spaces defined by the linear grooves 127 and the annular groove 111 accommodate balls 130, each of which is an engagement element. Referring to FIG. 3, the diameter d1 of each of the balls 130 is slightly greater than both the width d2 of each linear groove 127 and the width d3 of the annular groove 111. As a result, in the spaces between the linear grooves 127 and the annular groove 111, each ball 130 is movable in the extending direction of the corresponding linear groove 127 but substantially immovable in the width direction of the linear groove 127.

As illustrated in FIGS. 2 and 3, each linear groove 127 is inclined with respect to the annular groove 111. Specifically, the linear groove 127 is inclined such that the leading end in the rotating direction (the upper end section in the linear groove 127, which is located closer to the sheet surfaces of FIGS. 2 and 3) is arranged at a position offset from the trailing end in the rotating direction and toward the small diameter portion 123 of the driven-side rotor 120 (the position located rightward as viewed in FIGS. 2 and 3). The angle between the extending direction of each linear groove 127 and the extending direction of the annular groove 111 is 45°. That is, the linear groove 127 intersects the plane perpendicular to the axis while being inclined by 45° with respect to the plane. The leading end of each linear groove 127 located on the leading side in the rotating direction constitutes a holding portion 128, which is shallower than the other section of the linear groove 127. Specifically, each linear groove 127 is shallowest in the holding portion 128, which is located on the leading side in the rotating direction, and becomes gradually deeper toward the trailing end in the rotating direction.

When the driven-side rotor 120 is moved toward the driving-side rotor 110 by the urging force of the urging members 135 and arranged at the position shown in FIG. 3, the balls 130 are located in the holding portions 128 of the corresponding linear grooves 127. Since each holding portion 128 is shallow as has been described, the gap between the linear groove 127 and the annular groove 111 (see FIG. 1) in the holding portion 128 is small. The balls 130 are thus clamped between the driven-side rotor 120 and the driving-side rotor 110 and prohibited from rotating together with the driven-side rotor 120 relative to the driving-side rotor 110. In this manner, the driving-side rotor 110 and the driven-side rotor 120 are coupled to each other through the balls 130.

Hereinafter, regarding axial positions of the driven-side rotor 120 moving axially along the output shaft 210, the position at which the driving-side rotor 110 and the driven-side rotor 120 are coupled to each other, as illustrated in FIGS. 1 and 3, will be referred to as a coupling position.

Therefore, referring to FIG. 1, when the driven-side rotor 120 is arranged at the coupling position and the driving-side rotor 110 and the driven-side rotor 120 are coupled to each other through the balls 130, rotation of the crankshaft 250 is transmitted to the driven-side rotor 120 and the output shaft 210 through the driving-side pulley 260 and the belt 280. This causes the impeller 220, which rotates integrally with the output shaft 210, to pump coolant out of the pump 200.

As has been described, each linear groove 127 becomes deeper toward the trailing end in the rotating direction of the driving-side rotor 110. As a result, when the driven-side rotor 120 reaches the position shown in FIG. 2, each ball 130 is arranged in a section of the corresponding linear groove 127 that is deeper than the holding portion 128. Specifically, this arrangement is brought about by the fact that a substantial half of each ball 130 is accommodated in the annular groove 111 of the driving-side rotor 110 and axial movement of the ball 130 relative to the driving-side rotor 110 is thus restricted. When the ball 130 is released from the shallow holding portion 128 and enters the section of the linear groove 127 that is deeper than the holding portion 128, the ball 130 is permitted to rotate together with the driven-side rotor 120 relative to the driving-side rotor 110. This permits pivot of the driving-side rotor 110 and the driven-side rotor 120 relative to each other, thus switching to a state in which the driven-side rotor 120 is decoupled from the driving-side rotor 110.

Hereinafter, regarding axial positions of the driven-side rotor 120 moving axially along the output shaft 210, the position at which the driving-side rotor 110 and the driven-side rotor 120 are decoupled from each other, as illustrated in FIG. 2, will be referred to as a decoupling position.

In the first embodiment, each linear groove 127 is inclined by 45° with respect to the plane perpendicular to the axis for the reason described below. That is, if the depth change amount per unit length of the linear groove 127 remains unchanged, the length of the linear groove 127 necessary for switching between the coupled state and the decoupled state remains the same. Therefore, in this case, as the angle between the linear groove 127 and the plane perpendicular to the axis becomes greater, or, in other words, as the extending direction of the linear groove 127 becomes less inclined with respect to the axial direction, the axial length of the driven-side rotor 120, in which the linear grooves 127 are formed, becomes greater. As a result, as the angle between each linear groove 127 and the plane perpendicular to the axis becomes greater, the axial length of the driven-side rotor 120 becomes greater and the size of the clutch 100 becomes greater. On the other hand, when the driven-side rotor 120 is moved to the decoupling position to switch from the coupled state to the decoupled state, each ball 130, which is arranged in the shallow section of the corresponding linear groove 127 that is located on the leading side in the rotating direction, must be moved toward the trailing end in the rotating direction of the two rotors 110, 120. As the angle between each linear groove 127 and the plane perpendicular to the axis becomes smaller, the amount of moving each ball 130 toward the trailing end in the rotating direction, backward with respect to the rotating direction of the two rotors 110, 120, becomes greater. This increases the force necessary for switching to the decoupled state. Accordingly, in the first embodiment, the linear grooves 127 are inclined by 45° with respect to the plane perpendicular to the axis such that enlargement of the size of the driven-side rotor 120 is restrained and, also, increase of the force necessary for switching to the decoupled state is restrained.

The configuration for moving the driven-side rotor 120 between the decoupling position and the coupling position will hereafter be described.

As illustrated in FIG. 2, a locking groove 400, which extends circumferentially, is provided in an outer circumferential surface of the small diameter portion 123 of the driven-side rotor 120. The locking groove 400 has a helical groove 410, which is inclined with respect to the axial direction and extends in a helical shape about the axis, and a perpendicular groove 420, which extends perpendicular to the axial direction.

Specifically, the helical groove 410 extends along the entire circumference of the outer circumferential surface of the driven-side rotor 120 and is inclined to become closer to the driving-side rotor 110 on the trailing side in the rotating direction of the driving-side rotor 110. The width of the helical groove 410 becomes smaller from a starting end 411 toward a finishing end 412.

The perpendicular groove 420 is continuous from the helical groove 410 and extends along the entire circumference of the outer circumferential surface of the driven-side rotor 120. The perpendicular groove 420 is deeper than the helical groove 410 and is coupled to the helical groove 410 in a stepped manner.

With reference to FIGS. 2 and 3, the clutch 100 includes a locking member 140 and an actuator 150, which inserts and retracts a pin 141, which is located at the distal end of the locking member 140, with respect to the locking groove 400. The axial position of the locking member 140 is restricted. Referring to FIG. 3, the axial position of the locking member 140 is set such that, when the driven-side rotor 120 is arranged at the coupling position, the pin 141 is inserted into the helical groove 410 of the locking groove 400 at a position in the vicinity of the starting end 411. When the driven-side rotor 120 is located at the coupling position and the locking member 140 is moved toward the driven-side rotor 120 through the actuator 150, the pin 141 is inserted into the helical groove 410 at the position in the vicinity of the starting end 411. After having been inserted into the helical groove 410, the pin 141 becomes engaged with a side wall 413 of the helical groove 410 to stop the driven-side rotor 120 against the urging force of the urging members 135.

When the driven-side rotor 120 is coupled to the driving-side rotor 110 and the pin 141 of the locking member 140 is inserted in the helical groove 410, the driven-side rotor 120 rotates with the pin 141 engaged with the side wall 413 of the helical groove 410. Then, with the pin 141 sliding on the side wall 413 of the helical groove 410, the driven-side rotor 120 moves axially from the coupling position toward the decoupling position. When the inserting position of the pin 141 reaches the finishing end 412 of the helical groove 410 through rotation of the driven-side rotor 120, the pin 141 becomes pressed by the side wall 413 of the helical groove 410 and thus inserted into the perpendicular groove 420, which is deeper than the helical groove 410. In this manner, the driven-side rotor 120 is moved from the coupling position to the decoupling position. That is, by inserting the pin 141 of the locking member 140 into the locking groove 400 to engage the pin 141 with the side wall 413 of the helical groove 410, the clutch 100 moves the driven-side rotor 120 to the decoupling position against the urging force of the urging members 135.

Although torque transmission from the driving-side rotor 110 to the driven-side rotor 120 is blocked after the driving-side rotor 110 and the driven-side rotor 120 are decoupled from each other, the driven-side rotor 120 is continuously rotated by inertia force in a period immediately after such decoupling. However, as long as the driven-side rotor 120 is located at the decoupling position, the pin 141 is inserted in the perpendicular groove 420, which extends along the entire circumference of the outer circumferential surface of the driven-side rotor 120. The pin 141 is thus engaged with the side wall 423 of the perpendicular groove 420 to stop axial movement of the driven-side rotor 120. Further, in this state, torque is not transmitted from the driving-side rotor 110 to the driven-side rotor 120. The rotating speed of the driven-side rotor 120 thus gradually decreases until the driven-side rotor 120 stops rotating.

The driven-side rotor 120 is urged toward the coupling position by the urging force of the urging members 135. Therefore, to maintain the decoupled state, the pin 141 of the locking member 140 must be maintained in a state inserted in the perpendicular groove 420 of the driven-side rotor 120. To re-couple the driving-side rotor 110 and the driven-side rotor 120 to each other, the pin 141 is retracted from the perpendicular groove 420 of the locking groove 400 by the actuator 150. This disengages the locking member 140 and the driven-side rotor 120 from each other, thus causing the urging force of the urging members 135 to move the driven-side rotor 120 to the coupling position. As a result, the driving-side rotor 110 and the driven-side rotor 120 are switched to a re-coupled state.

The configuration of the actuator 150 will now be described in detail.

Figure 4:
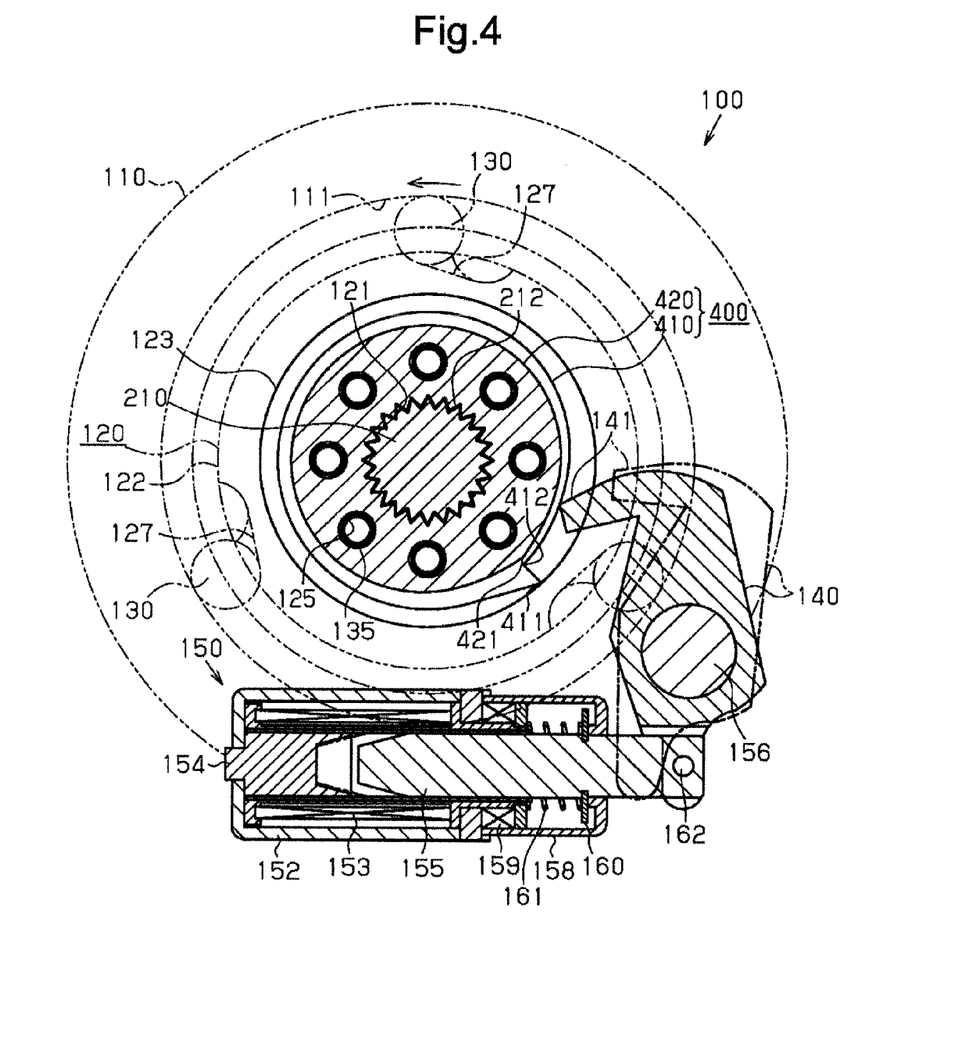
FIG. 4 is a cross-sectional view showing the configuration of an actuator that moves a locking member of the clutch of FIG. 1 into and out of a helical groove.

As illustrated in FIG. 4, the actuator 150 of the first embodiment is an electromagnetic actuator actuating using action of a magnetic field generated by electrifying a coil 153, which is accommodated in a first case 152.

The first case 152 is shaped like a tube with a bottom, and a fixed core 154 is fixed to the bottom of the first case 152. The coil 153 is arranged in the first case 152 to surround the fixed core 154. That is, in the actuator 150, the fixed core 154 and the coil 153 configure an electromagnet. A movable core 155 is movably received in the coil 153 of the first case 152 at a position facing the fixed core 154. In the first embodiment, both the fixed core 154 and the movable core 155 are iron cores.

A tubular second case 158 is fixed to a distal end section (the right end section as viewed in FIG. 4) of the first case 152. A permanent magnet 159 is fixed to the end section of the second case 158 fixed to the first case 152 to surround the movable core 155. The movable core 155 is accommodated in the first case 152 such that a basal end zone (the left end zone as viewed in FIG. 4) of the movable core 155 faces the fixed core 154, as has been described. On the other hand, a distal end zone (the right end zone as viewed in the drawing) is projected outward from the second case 158.

A ring member 160 is attached to the section of the movable core 155 accommodated in the second case 158. The second case 158 accommodates a coil spring 161, which has an end engaged with the second case 158 and the opposite end engaged with the ring member 160, in a compressed state.

The coil spring 161 urges the movable core 155 in such a direction that the movable core 155 projects from the second case 158 (rightward as viewed in FIG. 4). The section of the movable core 155 projected from the second case 158 is coupled to the locking member 140 through a fixing pin 162.

The locking member 140 is coupled to the movable core 155 pivotally at the basal end of the locking member 140 and is supported pivotally by a pivot shaft 156. This pivots the locking member 140 about the pivot shaft 156 serving as the pivot support point when the movable core 155 moves. Therefore, as represented by the solid lines in FIG. 4, as the extent of projection of the movable core 155 from the second case 158 caused by the urging force of the coil spring 161 increases, the pin 141 of the locking member 140 is inserted sequentially into the helical groove 410 and the perpendicular groove 420 of the driven-side rotor 120.

If, in this state, the coil 153 is electrified, a magnetic field is generated through such electrification to magnetize the fixed core 154 and the movable core 155. The movable core 155 is thus attracted toward the fixed core 154 against the urging force of the coil spring 161. The orientation of the magnetic field generated by the coil 153 coincides with the orientation of the magnetic field of the permanent magnet 159.

As the movable core 155 is attracted and moved toward the fixed core 154 (leftward as viewed in FIG. 4), the locking member 140 pivots in the clockwise direction as viewed in the drawing to retract the distal end of the locking member 140 from the locking groove 400. That is, by attracting the movable core 155 using the magnetic force generated by electrifying the coil 153, the actuator 150 retracts the locking member 140 from the locking groove 400.

By being attracted, the movable core 155 is moved to the contact position at which the movable core 155 contacts the fixed core 154 (the position represented by the long dashed double-short dashed lines in FIG. 4). After this, even if electrification is stopped, the magnetic force of the permanent magnet 159 holds the movable core 155 and the fixed core 154 in a contact state.

When the movable core 155 is held at the contact position represented by the long dashed double-short dashed lines in FIG. 4 and an electric current in a direction opposite to the direction of the electric current for attracting the movable core 155 is supplied to the coil 153, a magnetic field oriented opposite to the orientation of the magnetic field of the permanent magnet 159 is generated. This attenuates the attractive force of the permanent magnet 159, thus causing the urging force of the coil spring 161 to separate the movable core 155 from the fixed core 154 and move the movable core 155 to the projecting position represented by the solid lines in FIG. 4. When the movable core 155 moves from the contact position to the projecting position, the locking member 140 pivots counterclockwise as viewed in the drawing and the pin 141 of the locking member 140 is thus inserted into the locking groove 400.

When the movable core 155 is located at the projecting position separated from the fixed core 154, the urging force of the coil spring 161 exceeds the attractive force of the permanent magnet 159. Therefore, if the movable core 155 is separated from the fixed core 154 through electrification of the coil 153, the movable core 155 is held at the projecting position even if the electrification is stopped afterward.

That is, the actuator 150 of the first embodiment is a self-holding solenoid that switches engaged state of the clutch 100 by supplying a DC current in different directions to move the movable core 155 but does not need electrification when maintaining either the coupled state or the decoupled state.

Operation of the clutch 100 of the first embodiment will now be described.

When the movable core 155 of the actuator 150 is arranged at the contact position, as represented by the long dashed double-short dashed lines in FIG. 4, the pin 141 of the locking member 140 is exposed from the locking groove 400. In this state, the driven-side rotor 120 is held at the coupling position by the urging force of the urging members 135 and the clutch 100 is in the coupled state. That is, the clutch 100 transmits rotation of the driving-side rotor 110 to the output shaft 210.

If, in this state, the coil 153 of the actuator 150 is electrified to generate a magnetic field oriented opposite to the orientation of the magnetic field of the permanent magnet 159, the urging force of the coil spring 161 moves the movable core 155 from the contact position to the projecting position represented by the solid lines in FIG. 4. This pivots the locking member 140 counterclockwise as viewed in the drawing to insert the pin 141 of the locking member 140 into the helical groove 410 of the locking groove 400 of the driven-side rotor at a position in the vicinity of the starting end 411. The driven-side rotor 120 is thus locked and held in the state illustrated in FIG. 3.

When the driven-side rotor 120 is locked by the pin 141 and, in this state, rotates together with the driving-side rotor 110 to cause relative movement of the pin 141 in the helical groove 410, the driven-side rotor 120 moves from the coupling position toward the decoupling position and switches from the state shown in FIG. 3 to the state illustrated in FIG. 2. In this manner, the pin 141 is inserted into the perpendicular groove 420 and the driven-side rotor 120 reaches the decoupling position. Each of the balls 130 is thus arranged in the space between the deep section of the corresponding one of the linear grooves 127 and the annular groove 111 and allowed to rotate. This blocks transmission of rotation of the driving-side rotor 110 to the driven-side rotor 120, thus switching the clutch 100 to the disengaged state. The diameter d1 of each ball 130 is slightly greater than both the width d2 of each linear groove 127 and the width d3 of the annular groove 111. Therefore, even when movement of the driven-side rotor 120 to the decoupling position moves each ball 130 in the corresponding linear groove 127 from the holding portion 128 toward the deep section, movement of the ball in the width direction of the linear groove 127 is restrained and smooth movement of the ball 130 in the extending direction of the linear groove 127 is permitted.

In a period immediately after the driven-side rotor 120 and the driving-side rotor 110 are decoupled from each other, the driven-side rotor 120 receives action of friction force produced between the driven-side rotor 120 and the pin 141 of the locking member 140, with the pin 141 inserted in the perpendicular groove 420, as illustrated in FIG. 2. Meanwhile, the driven-side rotor 120 is continuously rotated by inertia force. The rotating speed of the driven-side rotor 120 then gradually decreases until, eventually, the driven-side rotor 120 stops rotating.

In contrast, to switch the clutch 100 from the disengaged state to the engaged state, the coil 153 of the actuator 150 is electrified to generate a magnetic field oriented in the same manner as the orientation of the magnetic field of the permanent magnet 159. Then, the magnetic force generated through such electrification attracts the movable core 155 toward the fixed core 154, thus moving the movable core 155 from the projecting position represented by the solid lines in FIG. 4 to the contact position represented by the long dashed double-short dashed lines in the drawing. This pivots the locking member 140 clockwise as viewed in FIG. 4, thus retracting the pin 141 of the locking member 140 fully from the locking groove 400.

After having been released from the locking member 140, the driven-side rotor 120 is moved to the coupling position by the urging force of the urging members 135. The driven-side rotor 120 and the driving-side rotor 110 are thus coupled together. As the driving-side rotor 110 rotates, each ball 130 receives force that acts to move the ball 130 in the corresponding linear groove 127 toward the leading end in the rotating direction. Therefore, as the drive force input from the driving-side rotor 110 becomes greater, the ball 130 becomes more driven toward the corresponding shallow holding portion 128 in the linear groove 127. This facilitates maintenance of the ball 130 at the position between the holding portion 128 of the linear groove 127 and the annular groove 111 in the state clamped between the driving-side rotor 110 and the driven-side rotor 120, thus permitting transmission of great drive force. The diameter d1 of each ball 130 is slightly greater than both the width d2 of each linear groove 127 and the width d3 of the annular groove 111. As a result, when the driven-side rotor 120 moves to the coupling position and thus each ball 130 moves from the deep section of the corresponding linear groove 127 toward the holding portion 128, movement of the ball 130 in the width direction of the linear groove 127 is restrained and smooth movement of the ball 130 in the extending direction of the linear groove 127 is permitted.

The above described first embodiment provides the following advantages.

(1) In the first embodiment, each linear groove 127 serving as a guide groove extends in a manner inclined with respect to the annular groove 111. Each ball 130 is accommodated in the space in the section in which the annular groove 111 and the corresponding linear groove 127, which is inclined with respect to the annular groove 111, face each other. Therefore, by axially moving the driving-side rotor 110 and the driven-side rotor 120 relative to each other, the positions of the sections of the annular groove 111 and the linear groove 127 facing each other are changed. The ball 130 is thus moved between the driving-side rotor 110 and the driven-side rotor 120. Therefore, the position of each ball 130 is changed without employing a holding device for accommodating the ball 130 between the driving-side rotor 110 and the driven-side rotor 120. As a result, the states of power transmission between the driven-side rotor 120 and the driving-side rotor 110 are switched without using a holding device.

(2) In the first embodiment, the end section of each linear groove 127 on the leading side in the rotating direction is the holding portion 128, which is shallower than the other section of the linear groove 127. As the driving-side rotor 110 rotates, each ball 130 receives force that acts to move the ball 130 in the corresponding linear groove 127 in the rotating direction of the driving-side rotor 110, or, in other words, toward the leading end in the rotating direction. Therefore, in the first embodiment, as the drive force input from the driving-side rotor 110 becomes greater, each ball 130 becomes more driven toward the shallow holding portion 128 of the corresponding linear groove 127. This facilitates maintenance of the ball 130 in a state clamped between the driving-side rotor 110 and the driven-side rotor 120, thus permitting transmission of great drive force.

(3) In the first embodiment, the driven-side rotor 120 is urged toward the coupling position by the urging force of the urging members 135. When the driven-side rotor 120 is arranged at the coupling position, the driving-side rotor 110 and the driven-side rotor 120 are in the coupled state. If the pin 141 of the locking member 140 is inserted in the helical groove 410 of the driven-side rotor 120, which is in the coupled state and rotates together with the driving-side rotor 110, the driven-side rotor 120 rotates with the side wall 413 of the helical groove 410, which extends about the axis and is inclined with respect to the axial direction, engaged with the locking member 140. This moves the driven-side rotor 120 from the coupling position to the decoupling position against the urging force of the urging members 135, thus decoupling the driving-side rotor 110 and the driven-side rotor 120 from each other. In this manner, the force necessary for disengaging the clutch 100 is obtained from the rotation force of the driven-side rotor 120. Such disengagement is thus accomplished with small force.

(4) In the first embodiment, each linear groove 127 is inclined by 45° with respect to the annular groove 111. That is, the linear grooves 127 intersect the plane perpendicular to the axis each in a manner inclined by 45°. This restrains enlargement of the size of the driven-side rotor 120, which has the linear grooves 127, and also restrains increase of the force necessary for switching to the disengaged state.

(5) In the first embodiment, engagement elements are the balls 130. Each ball 130 has neither anisotropy nor corners. The ball 130 is thus moved smoothly even in a state clamped between the annular groove 111 and the corresponding linear groove 127, which are inclined with respect to each other. This permits smooth switching of the clutch 100 between the engaged state and the disengaged state.

(6) In the first embodiment, the diameter d1 of each ball 130 is slightly greater than both the width d2 of each linear groove 127 and the width d3 of the annular groove 111. Therefore, when each ball 130 moves in the extending direction of the corresponding linear groove 127 to switch the clutch 100 between the engaged state and the disengaged state, unnecessary movement of the ball 130 in the width direction of the linear groove 127 and consequent increase of vibration are restrained. Further, when the clutch 100 is switched from the disengaged state to the engaged state, unstable positioning of each ball 130 and consequent prolongation of the time consumed by the ball 130 to reach the holding portion 128 to switch the power transmission states are restrained.

The configuration of each component in the first embodiment is not limited to the one described above, but may be modified as illustrated below.

In the first embodiment, each linear groove extends in a manner inclined by 45° with respect to the annular groove. However, the angle between the extending direction of each linear groove and the annular groove is not restricted to this angle. The linear grooves may be inclined with respect to the annular groove each by an angle either greater or smaller than 45°. Alternatively, the linear grooves may extend in the axial direction. Further, the linear grooves may be inclined such that each ball is arranged in the corresponding linear groove at a position on the trailing side in the rotating direction when the clutch is in the engaged state and at a position on the leading side in the rotating direction when the clutch is in the disengaged state. In this case, a shallow holding portion may be located in each linear groove at a position on the trailing side in the rotating direction. Although this arrangement does not promote the action of the rotation force of the driving-side rotor for moving the ball to the holding portion in the linear groove, the clutch is switched to the engaged state, even in this case, by increasing the urging force of the urging members.

In the first embodiment, the diameter of each ball is slightly greater than both the width of the annular groove and the width of each linear groove. However, for example, the diameter of the ball may be substantially equal to both the width of the annular groove and the width of the linear groove. That is, the diameter of the ball may be equal to both the width of the annular groove and the width of the linear groove. Alternatively, both the width of the annular groove and the width of the linear groove may be slightly greater than the diameter of the ball. Even in these cases, each ball is substantially immovable in the width direction, thus ensuring movability of the ball in the extending direction of the annular groove or the linear groove while restraining unnecessary movement of the ball in the width direction. Further, the relationships of the diameter of each ball with the width of the annular groove and the width of the linear groove are not restricted to the illustrated relationships. That is, as long as each ball is accommodated in the space in the section in which the corresponding linear groove and the annular groove face each other and moved in this space to switch between the coupled state and the decoupled state, any suitable configuration may be employed.

Second Embodiment

A clutch according to a second embodiment will now be described with reference to FIGS. 5 to 8.

Like the clutch of the first embodiment, the clutch of the second embodiment switches states of power transmission from an engine crankshaft to a water pump that circulates engine coolant.

In the clutch 100 of the second embodiment, a guide groove of the driven-side rotor 120 is shaped differently from the guide groove of the clutch 100 of the first embodiment. Specifically, as illustrated in FIG. 5, the guide groove in the driven-side rotor 120 of the clutch 100 of the second embodiment is a curved groove 129, which extends in the outer circumferential surface of the driven-side rotor 120 in a curved manner.

The other components are configured identically with the corresponding components of the clutch 100 of the first embodiment. Therefore, identical reference numerals are given to the identically configured components to omit description thereof. The description below is thus focused on differences between the clutch 100 of the first embodiment and the clutch 100 of the second embodiment.

Figure 5:
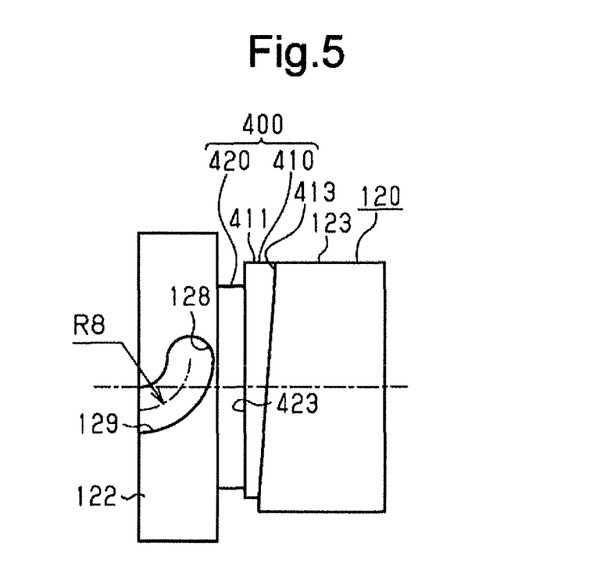
FIG. 5 is a side view showing a driven-side rotor of a clutch according to a second embodiment.

With reference to FIG. 5, the driven-side rotor 120 of the clutch 100 of the second embodiment has guide grooves, or, in other words, curved grooves 129, each of which is in the outer circumferential surface of the large diameter portion 122 and extends in a direction intersecting the plane perpendicular to the axis. The curved grooves 129 are arranged at intervals in the circumferential direction. Each of the balls 130, which is an engagement element, is accommodated in the space defined by the annular groove 111, which is in the inner circumferential surface of the driving-side rotor 110, and the corresponding one of the curved grooves 129.

The diameter of each ball 130 is 6.0 millimeters and the width of each curved groove 129 and the width of the annular groove 111 are both 6.1 millimeters. As a result, in the spaces between the curved grooves 129 and the annular groove 111, each ball 130 is movable in the extending direction of the corresponding curved groove 129 but substantially immovable in the width direction of the curved groove 129.

Referring to FIG. 5, the curvature of the center line of each curved groove 129 is R8. That is, the curved groove 129 is curved such that the mudline of the curved groove 129 defines an arch having a radius of 8 millimeters.

Also, with reference to FIG. 5, each curved groove 129 is inclined such that the end section on the leading side in the rotating direction (the upper end section of the curved groove 129 located close to the sheet surface of FIG. 5) is located at a position offset from the end section on the trailing side in the rotating direction and toward the small diameter portion 123 of the driven-side rotor 120 (the right position as viewed in FIG. 5). In each curved groove 129, the end section on the leading side in the rotating direction provides the holding portion 128, which is shallower than other sections. Specifically, the curved groove 129 is shallowest in the holding portion 128, which is arranged on the leading side in the rotating direction, and becomes gradually deeper toward the trailing end in the rotating direction.

Figure 6:
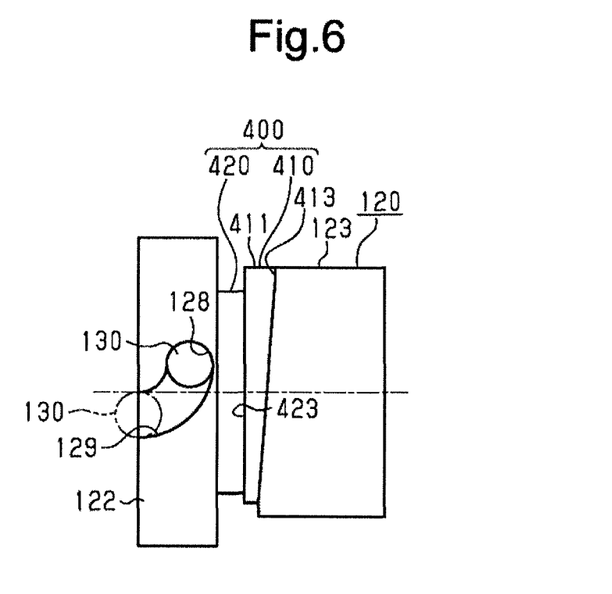
FIG. 6 is a side view showing the driven-side rotor of FIG. 5.

When the driven-side rotor 120 is moved toward the driving-side rotor 110 by the urging force of the urging members 135 and thus arranged at the coupling position, each ball 130 is located in the holding portion 128 of the corresponding curved groove 129, as represented by the solid circle in FIG. 6. As has been described, the holding portion 128 is shallow. Therefore, in this case, the gap between each curved groove 129 and the annular groove 111 of the driving-side rotor 110 is small. The balls 130 are thus clamped between the driven-side rotor 120 and the driving-side rotor 110 and prohibited from rotating. This brings about a coupled state, in which the driving-side rotor 110 and the driven-side rotor 120 are coupled to each other through the balls 130.

When the driven-side rotor 120 is arranged at the coupling position and the driving-side rotor 110 and the driven-side rotor 120 are coupled to each other through the balls 130, rotation of the crankshaft 250 is transmitted to the driven-side rotor 120 and the output shaft 210 through the driving-side pulley 260 and the belt 280. As a result, the impeller 220, which rotates integrally with the output shaft 210, pumps coolant out of the pump 200.

Also, as has been described, each curved groove 129 becomes deeper toward the trailing end in the rotating direction of the driving-side rotor 110. Therefore, when the driven-side rotor 120 is located at the decoupling position, each ball 130 is arranged in a section of the corresponding curved groove 129 that is deeper than the holding portion 128, as represented by the long dashed short dashed circle in FIG. 6. Specifically, this arrangement is brought about by the fact that a substantial half of the ball 130 is accommodated in the annular groove 111 of the driving-side rotor 110 and axial movement of the ball 130 relative to the driving-side rotor 110 is restricted. If the ball 130 is released from the shallow holding portion 128 and enters a section of the curved groove 129 that is deeper than the holding portion 128, the ball 130 is permitted to rotate. This permits rotation of the driving-side rotor 110 and the driven-side rotor 120 relative to each other, thus switching to a decoupled state, in which the driven-side rotor 120 is decoupled from the driving-side rotor 110.

If switching operation from the decoupled state to the coupled state causes the balls 130 to be quickly clamped between the driving-side rotor 110 and the driven-side rotor 120 and thus rapidly increases the rotating speed of the driven-side rotor 120, the clutch 100 receives great impact load due to the switching operation to the coupled state.

However, in the clutch 100 of the second embodiment, each curved groove 129 of the driven-side rotor 120 is curved as has been described.

As illustrated in FIG. 6, each curved groove 129 is curved such that the inclination of the curved groove 129 with respect to the rotating direction of the driving-side rotor 110 becomes gradually smaller from the section of the curved groove 129 in which the ball 130 is arranged when in the decoupled state toward the section in which the ball 130 is located when in the coupled state. In other words, the curved groove 129 is curved such that the curved groove 129 is shifted gradually toward the leading end in the rotating direction of the driving-side rotor 110 from the section of the curved groove 129 in which the ball 130 is arranged when in the decoupled state toward the section in which the ball 130 is located when in the coupled state.

In this configuration, when the driving-side rotor 110 and the driven-side rotor 120 are axially moved relative to each other to switch from the decoupled state to the coupled state, the movement amount of each ball 130, which moves along the corresponding curved groove 129, in the curved groove 129 in the rotating direction of the driving-side rotor 110 becomes greater toward the coupled state.

Therefore, at an early stage of switching operation from the decoupled state to the coupled state, the movement amount of each ball 130 in the curved groove 129 in the aforementioned rotating direction is small, and the ball 130 thus does not become clamped between the driving-side rotor 110 and the driven-side rotor 120. Accordingly, friction causes the rotating speed of the driving-side rotor 110 and the rotating speed of the driven-side rotor 120 to become close to each other. Then, at a later stage of the switching operation from the decoupled state to the coupled state, the movement amount of each ball 130 in the curved groove 129 in the rotating direction increases and the ball 130 is clamped between the driving-side rotor 110 and the driven-side rotor 120. This couples the driving-side rotor 110 and the driven-side rotor 120 to each other.

That is, in the above-described configuration, coupling between the driving-side rotor 110 and the driven-side rotor 120 progresses slowly, thus reducing the impact load caused by the switching operation from the decoupled state to the coupled state.

Figure 7:
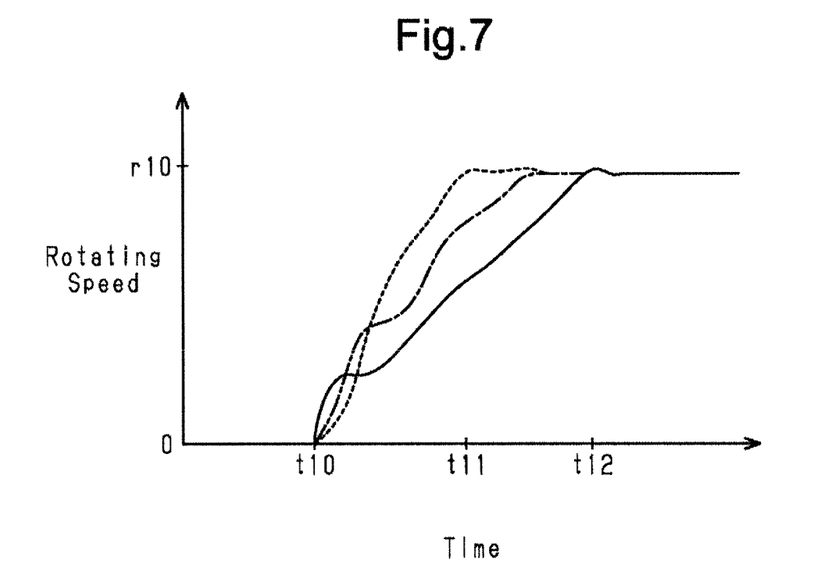
FIG. 7 is a graph representing the relationship between the time necessary for switching from a disengaged state to an engaged state and the curvature of a curved groove of the clutch of the second embodiment.

FIG. 7 is a graph representing change of the rotating speed of the driven-side rotor 120 caused by switching from the decoupled state to the coupled state. In the graph, the solid line represents change of the rotating speed of the driven-side rotor 120 of the clutch 100 of the second embodiment. The broken line represents change of the rotating speed of the driven-side rotor 120 in a case having linear guide grooves. The long dashed short dashed line represents change of the rotating speed of the driven-side rotor 120 in a case in which guide grooves are curved grooves each having a center line with a curvature R14.

In the case in which the guide grooves are linear grooves as represented by the broken line in FIG. 7, the rotating speed of the driven-side rotor 120 starts to increase rapidly at a point in time t10, at which switching operation from the decoupled state to the coupled state is started and the driven-side rotor 120 is moved from the decoupling position toward the coupling position. The rotating speed of the driven-side rotor 120 reaches r10 at a point in time t11 and switching to the coupled state is complete.

In contrast, in the clutch 100 of the second embodiment, as represented by the solid line in FIG. 7, at the point in time t10, at which switching operation from the decoupled state to the coupled state is started and the driven-side rotor 120 is moved from the decoupling position toward the coupling position, the driven-side rotor 120 starts rotating but the rotating speed of the driven-side rotor 120 increases more slowly than the case with the linear grooves, which is represented by the broken line. Then, at a point in time t12, the rotating speed of the driven-side rotor 120 reaches r10 and switching to the coupled state is complete.

As represented by the long dashed short dashed line in FIG. 7, in the case with the curved grooves each having the center line with the curvature R14, the rotating speed of the driven-side rotor 120 increases more slowly than the case with the linear grooves represented by the broken line but more rapidly than the case of the clutch 100 of the second embodiment represented by the solid line.

As has been described, the clutch 100 of the second embodiment permits slower progression of the coupling between the driving-side rotor 110 and the driven-side rotor 120, compared to either the case in which the guide grooves are the curved grooves each having the center line with the curvature R14 or the case with the linear grooves.

Figure 8:
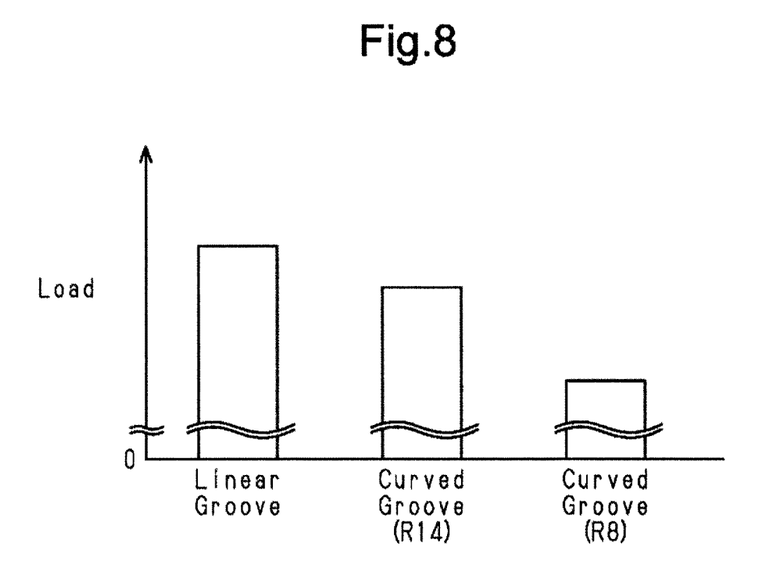
FIG. 8 is a graph representing the relationship between the impact load at the time of switching from the disengaged state to the engaged state and the curvature of the curved groove of the clutch of the second embodiment.

FIG. 8 is a graph representing the impact load caused by switching from the coupled state to the decoupled state. As represented on the right side of the graph, the case with the curved grooves 129 each having the center line with the curvature R8, as in the clutch 100 of the second embodiment, causes small impact load compared to the case in which the guide grooves are the curved grooves each having the center line with the curvature R14 or the case with the linear grooves. FIG. 8 also shows that, as long as the guide grooves are curved grooves, even the case in which the curvature of the center line of each curved groove is R14 causes small impact load compared to the case in which the guide grooves are linear grooves.

As has been described, the clutch 100 of the second embodiment reduces the impact load caused by switching operation from the decoupled state to the coupled state compared to either the case in which the guide grooves are the curved grooves each having the center line with the curvature R14 or the case in which the guide grooves are linear grooves.

The above described second embodiment provides the following advantages.

(1) Also in the second embodiment, the curved grooves 129, which are the guide grooves, are inclined with respect to the annular groove 111. Each of the balls 130 is accommodated in the space in the section in which the annular groove 111 and the corresponding one of the curved grooves 129, which are inclined with respect to the annular groove 111, face each other. Therefore, by axially moving the driving-side rotor 110 and the driven-side rotor 120 relative to each other, the positions of the sections of the annular groove 111 and each curved groove 129 facing each other are changed and the balls 130 are moved between the driving-side rotor 110 and the driven-side rotor 120. As a result, the position of each ball 130 is changed without employing a holding device for accommodating the ball 130 between the driving-side rotor 110 and the driven-side rotor 120. The states of power transmission between the driven-side rotor 120 and the driving-side rotor 110 are thus switched without using the holding device.

(2) Also in the second embodiment, the end section of each curved groove 129, which is a guide groove, on the leading side in the rotating direction is the holding portion 128, which is shallower than the other sections of the curved groove 129. As the driving-side rotor 110 rotates, each ball 130 receives force to move the ball 130 in the corresponding curved groove 129 in the rotating direction of the driving-side rotor 110, or, in other words, toward the leading end in the rotating direction. In the second embodiment, as the drive force input from the driving-side rotor 110 becomes greater, each ball 130 becomes more driven toward the shallow holding portion 128 of the corresponding curved groove 129. This facilitates maintenance of the ball 130 in a state clamped between the driving-side rotor 110 and the driven-side rotor 120. This permits transmission of great drive force.

(3) In the second embodiment, the driven-side rotor 120 is urged toward the coupling position by the urging force of the urging members 135. When the driven-side rotor 120 is arranged at the coupling position, the driving-side rotor 110 and the driven-side rotor 120 are in the coupled state. If the pin 141 of the locking member 140 is inserted into the helical groove 410 of the driven-side rotor 120, which is in the coupled state and rotates together with the driving-side rotor 110, the driven-side rotor 120 rotates with the side wall 413 of the helical groove 410, which extends about the axis and is inclined with respect to the axial direction, engaged with the locking member 140. As a result, the driven-side rotor 120 is moved from the coupling position to the decoupling position against the urging force of the urging members 135, thus decoupling the driving-side rotor 110 and the driven-side rotor 120 from each other. In this manner, the force necessary for disengaging the clutch 100 is obtained from the rotation force of the driven-side rotor 120. Such disengagement is thus accomplished with small force.

(4) If switching operation from the decoupled state to the coupled state causes the balls 130 to be quickly clamped between the driving-side rotor 110 and the driven-side rotor 120 and thus rapidly increases the rotating speed of the driven-side rotor 120, the clutch 100 receives great impact load due to switching operation to the engaged state.

In the second embodiment, at an early stage of the switching operation from the decoupled state to the coupled state, the movement amount of each ball 130 in the corresponding curved groove 129 in the aforementioned rotating direction is small and the ball 130 does not become clamped between the driving-side rotor 110 and the driven-side rotor 120. Accordingly, friction causes the rotating speed of the driving-side rotor 110 and the rotating speed of the driven-side rotor 120 to become close to each other. Then, at a later stage of the switching operation from the decoupled state to the coupled state, the movement amount of each ball 130 in the curved groove 129 in the rotating direction increases and the ball 130 is clamped between the driving-side rotor 110 and the driven-side rotor 120. This couples the driving-side rotor 110 and the driven-side rotor 120 to each other.

That is, in the configuration of the second embodiment, coupling between the driving-side rotor 110 and the driven-side rotor 120 progresses slowly, thus reducing the impact load caused by the switching operation from the decoupled state to the coupled state.

(5) In the second embodiment, engagement elements are the balls 130. Each ball 130 has neither anisotropy nor corners. The ball 130 is thus moved smoothly even in a state clamped between the annular groove 111 and the corresponding curved groove 129, which are inclined with respect to each other. This permits smooth switching of the clutch 100 between the engaged state and the disengaged state.

(6) In the second embodiment, both the width of each curved groove 129 and the width of the annular groove 111 are slightly greater than the diameter of each ball 130. The balls 130 are thus accommodated in the corresponding curved grooves 129 each in a state substantially immovable in the width direction of the curved groove 129. Therefore, when each ball 130 moves in the extending direction of the corresponding curved groove 129 to switch the clutch 100 between the engaged state and the disengaged state, unnecessary movement of the ball 130 in the width direction of the curved groove 129 and consequent increase of vibration are restrained. Further, when the clutch 100 is switched from the disengaged state to the engaged state, unstable positioning of each ball 130 and consequent prolongation of the time consumed by the ball 130 to reach the holding portion 128 to switch the power transmission states are restrained.

The configuration of each component in the second embodiment is not limited to the one described above, but may be modified as illustrated below.

Although the second embodiment illustrates an example in which the center line of each curved groove has the curvature R8, the curvature of the curved groove may be changed as needed.

In the second embodiment, each curved groove is curved by a uniform curvature along the entire length of the curved groove. However, the curved groove is not restricted to this shape and the curvature of the curved groove may start to vary at a certain position of the curved groove. Also, the curved groove does not necessarily have to be curved such that the inclination of the curved groove with respect to the rotating direction of the driving-side rotor becomes gradually smaller from the section in which the corresponding ball is arranged when in the decoupled state toward the section in which the ball is located when in the coupled state. However, to permit slow progression of coupling between the driving-side rotor and the driven-side rotor and reduce the impact load caused by switching operation from the decoupled state to the coupled state, it is preferable that each curved groove be curved such that the inclination of the curved groove with respect to the rotating direction of the driving-side rotor becomes gradually smaller, as in the second embodiment.

In the second embodiment, both the width of the annular groove and the width of each of the curved grooves serving as the guide grooves are slightly greater than the diameter of each ball. However, for example, the width of the annular groove or the width of each curved groove may be substantially equal to the diameter of each ball. That is, the width of the annular groove and the width of each curved groove each may be equal to or slightly smaller than the diameter of each ball. Even in these cases, the ball is substantially immovable in the width direction of the corresponding curved groove. This ensures movability of the ball in the extending direction of the annular groove or the curved groove while restraining unnecessary movement of the ball in the width direction. Further, the relationships of the diameter of each ball with the width of the annular groove and the width of each curved groove are not restricted to the illustrated relationships. That is, as long as each ball is accommodated in the space in the section in which the corresponding curved groove and the annular groove face each other and moves in this space to switch between the coupled state and the decoupled state, any suitable configuration may be employed.

The clutch for solving the above-described problem is not restricted to the configurations of the illustrated embodiments but may be embodied in forms modified from these configurations as needed, including the forms described below.

In each of the illustrated embodiments, the engagement elements are balls. However, the engagement elements are not restricted to the balls but may be components having any other suitable shapes than the balls, such as pillar-shaped rollers. That is, any suitable engagement elements may be employed as long as each engagement element is shaped such that, by axially moving the driving-side rotor and the driven-side rotor relative to each other, the engagement element is moved in the space in the section in which the corresponding guide groove and the annular groove face each other and is capable of switching the clutch to the engaged state or the disengaged state by moving in the space.

In each of the illustrated embodiment, the number of the urging members for urging the driven-side rotor to the decoupling position may be changed as needed. For example, the driven-side rotor may be urged by a single urging member.

As long as the urging members urge the driven-side rotor toward the coupling position, the urging members are not restricted to the above-described compression coil springs. For example, a tension spring that pulls the driven-side rotor toward the coupling position may be employed as an urging member.

The actuator is not restricted to the self-holding solenoid but may be, for example, any other suitable solenoid in which a pin of a locking member is inserted in a locking groove only when a coil is electrified. In this configuration, the clutch is decoupled only when the coil is electrified. The clutch is thus held in the coupled state when the coil cannot be electrified. As a result, even when the actuator fails to operate normally, the pump can be actuated.

The actuator is not restricted to a solenoid. That is, any other suitable actuator other than the solenoid, such as a hydraulic actuator, may be employed to selectively insert and retract the locking member.

The illustrated embodiments illustrate the clutches for switching the states of power transmission from the crankshaft to the pump. However, the configuration of the clutch may be used in a clutch mounted between any other suitable auxiliary device, such as a compressor or an oil pump, and the crankshaft. Also, the configuration of the clutch is not restricted to the clutch for switching the states of power transmission from the crankshaft, but may be a clutch for switching states of power transmission from any other suitable drive source.

In the clutch of each of the illustrated embodiments, the outer wheel is the driving-side rotor and the inner wheel is the driven-side rotor. However, the outer wheel may be the driven-side rotor and the inner wheel may be the driving-side rotor. Also, the clutch may be adapted to be switchable between a state in which the outer wheel is the driving-side rotor and the inner wheel is the driven-side rotor and a state in which the outer wheel is the driven-side rotor and the inner wheel is the driving-side rotor.

In the illustrated embodiments, the outer wheel has the annular groove and the inner wheel has either the linear grooves or the curved grooves, which serve as the guide grooves. However, the outer wheel may have the guide grooves and the inner wheel may have the annular groove.

DESCRIPTION OF THE REFERENCE NUMERALS

100 . . . clutch, 110 . . . driving-side rotor, 111 . . . annular groove, 120 . . . driven-side rotor, 121 . . . engagement portion, 122 . . . large diameter portion, 123 . . . small diameter portion, 124 . . . recess, 125 . . . accommodating recess, 127 . . . linear groove, 128 . . . holding portion, 129 . . . curved groove, 130 . . . ball, 135 . . . urging member, 140 . . . locking member, 141 . . . pin, 150 . . . actuator, 152 . . . first case, 153 . . . coil, 154 . . . fixed core, 155 . . . movable core, 156 . . . pivot shaft, 158 . . . second case, 159 . . . permanent magnet, 160 . . . ring member, 161 . . . coil spring, 162 . . . fixing pin, 200 . . . pump, 210 . . . output shaft, 211 . . . locking projection, 212 . . . straight spline, 220 . . . impeller, 250 . . . crankshaft, 260 . . . driving-side pulley, 270 . . . driven-side pulley, 280 . . . belt, 300 . . . housing, 310 . . . accommodating portion, 320 . . . support member, 330 . . . first bearing, 340 . . . second bearing, 400 . . . locking groove, 410 . . . helical groove, 413 . . . side wall, 420 . . . perpendicular groove

The invention claimed is:

1. A clutch comprising:
   a rotary shaft;
   an outer wheel and an inner wheel both rotational about an axis of the rotary shaft; and
   an engagement element arranged between the outer wheel and the inner wheel, wherein
   an inner circumferential surface of the outer wheel and an outer circumferential surface of the inner wheel face each other,
   the inner circumferential surface of the outer wheel has an annular groove extending circumferentially along the entire circumference of the inner circumferential surface,
   the outer circumferential surface of the inner wheel has a guide groove extending in a direction intersecting a plane perpendicular to the axis of the rotary shaft,
   a space configured to accommodate the engagement element is provided in a section in which the guide groove and the annular groove face each other,
   the engagement element is moved in the guide groove and the annular groove by moving the outer wheel and the inner wheel relative to each other in the axial direction of the rotary shaft,
   by moving the engagement element toward a section in which a gap between the outer wheel and the inner wheel is smaller than a diameter of the engagement element to clamp the engagement element between the outer wheel and the inner wheel, a coupled state is achieved, in which the outer wheel and the inner wheel are coupled to each other,
   by moving the engagement element to a section in which the gap between the outer wheel and the inner wheel is greater than the diameter of the engagement element, a decoupled state is achieved, in which the outer wheel and the inner wheel are decoupled from each other,
   the outer wheel is a driving-side rotor and the inner wheel is a driven-side rotor,
   the guide groove is a curved groove extending in the outer circumferential surface of the inner wheel in a curved manner,
   the guide groove is shallower in a section in which the engagement element is arranged when in the coupled state than a section in which the engagement element is arranged when in the decoupled state, and
   the guide groove is configured such that, when the decoupled state is switched to the coupled state, the engagement element moves along the guide groove in a rotating direction of the outer wheel.

2. The clutch according to claim 1, wherein in addition to the guide groove, a helical groove extending about the axis of the rotary shaft is provided in the outer circumferential surface of the inner wheel, the clutch further comprises a locking member and an urging member configured to urge the inner wheel from a decoupling position, at which the inner wheel is decoupled from the outer wheel, toward a coupling position, at which the inner wheel is coupled to the outer wheel, and an engagement member is inserted into the helical groove and engaged with a side wall of the helical groove to move the inner wheel to the decoupling position against an urging force of the urging member.

3. The clutch according to claim 1, wherein the curved groove is curved such that an inclination of the curved groove with respect to the rotating direction of the outer wheel becomes gradually smaller from the section in which the engagement element is arranged when in the decoupled state toward the section in which the engagement element is arranged when in the coupled state.

4. The clutch according to claim 1, wherein the engagement element is a ball.

* * * * *